United States Patent [19]

Yamamoto

[11] 4,207,582

[45] Jun. 10, 1980

[54] INK LIQUID ISSUANCE CONTROL IN AN INK JET SYSTEM PRINTER OF THE CHARGE AMPLITUDE CONTROLLING TYPE

[75] Inventor: Yoichi Yamamoto, Nara, Japan

[73] Assignee: Sharp Kabushiki Kaisha, Osaka, Japan

[21] Appl. No.: 875,539

[22] Filed: Feb. 6, 1978

[30] Foreign Application Priority Data

Feb. 4, 1977 [JP] Japan .................................. 52-12351

[51] Int. Cl.² .......................................... G01D 15/18
[52] U.S. Cl. ................................................ 346/140 R
[58] Field of Search .............................. 346/75, 140 R

[56] References Cited

U.S. PATENT DOCUMENTS 3,925,788  12/1975  Kashio ..................... 346/140 R X
3,925,789  12/1975  Kashio ..................... 346/140 R X Primary Examiner—George H. Miller, Jr.
Attorney, Agent, or Firm—Birch, Stewart, Kolasch and Birch

[57] ABSTRACT

An ink liquid supply system for an ink jet system printer of the charge amplitude controlling type is provided with an ink liquid issuance controlling means for terminating the ink liquid issuance from a nozzle. A detection means responsive to input print data signals is provided for terminating the ink liquid issuance from the nozzle when the input print data signals are not introduced for a predetermined time period.

13 Claims, 2 Drawing Figures

INK LIQUID ISSUANCE CONTROL IN AN INK JET SYSTEM PRINTER OF THE CHARGE AMPLITUDE CONTROLLING TYPE

BACKGROUND OF THE INVENTION

The present invention relates to an ink jet system printer and, more particularly, to an ink issuance control system in an ink jet system printer of the charge amplitude controlling type.

Generally, in an ink jet system printer of the charge amplitude controlling type, ink droplets are continuously emitted from a nozzle without regard to whether or not the actual printing operation is performed or not performed while the ink jet system printer is supplied with power. The ink droplets not contributive to the actual printing operation are directed toward a beam gutter for recirculation purposes. A portion of the volatile component included within the ink liquid is unavoidably decreased due to volatilizing while the ink droplets travel in the air from the nozzle to the beam gutter.

Accordingly, the concentration of the ink liquid is gradually increased when the ink droplets are continuously emitted from the nozzle without performing the actual printing operation. The ink liquid concentration must be maintained at a predetermined value to secure the ink droplet formation or to ensure stable printing in an ink jet system printer of the charge amplitude controlling type. Moreover, there is a possibility that the ink liquid compositions are oxidized while the ink droplets travel in the air from the nozzle to the beam gutter. The oxidized compositions will deteriorate the ink liquid and influence the stable operation of the ink jet system printer.

OBJECTS AND SUMMARY OF THE INVENTION

Accordingly, an object of the present invention is to stabilize the print operation in an ink jet system printer.

Another object of the present invention is to minimize deterioration of the ink liquid employed in an ink jet system printer.

Still another object of the present invention is to provide an ink jet system printer of the charge amplitude controlling type suited for use as a receiver for data communication.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In brief, an ink jet system printer of the present invention is so constructed as to terminate the ink liquid issuance from a nozzle when print information data is not applied to the ink jet system printer for a predetermined time period.

In a preferred form, an ink liquid supply system for an ink jet system printer of the charge amplitude controlling type of the present invention comprises a pump for supplying the ink liquid to the nozzle under a predetermined pressure, and an electromagnetic cross valve for controlling the supply direction of the ink liquid. A detection means is provided in an electronic control circuit for detecting whether the print information data is applied to the electronic control circuit of the ink jet system printer.

A determination circuit is connected to the detection means for developing a control signal when the print information data is not applied to the ink jet system printer for a predetermined time period. The thus developed control signal is applied to the electromagnetic cross valve and the pump in order to terminate the ink liquid issuance from the nozzle when the print information data is not applied to the ink jet system printer for a predetermined time period, thereby minimizing deterioration of the ink liquid employed in the ink jet system printer.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
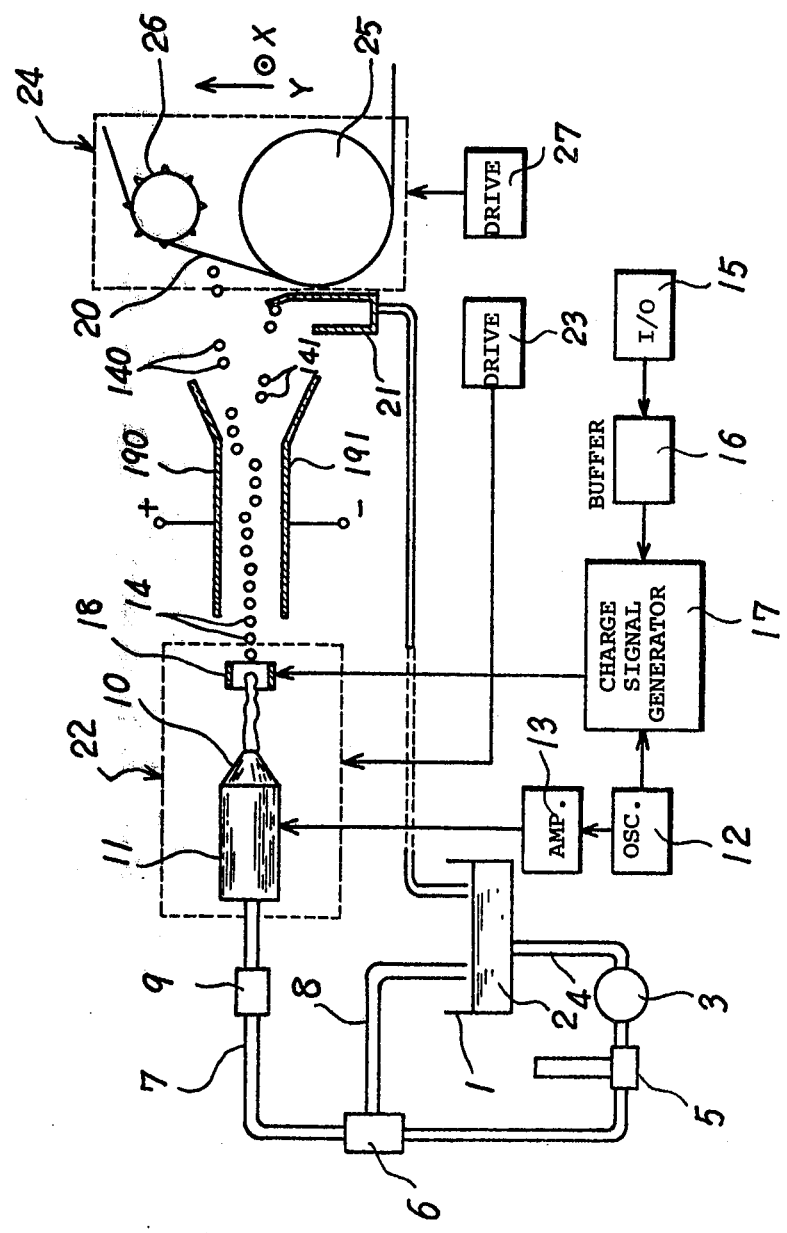
FIG. 1 is a block diagram of a basic structure of an ink jet system printer of the charge amplitude controlling type.

FIG. 1 shows a basic structure of an ink jet system printer of the charge amplitude controlling type.

Generally, the ink jet system printer of the charge amplitude controlling type comprises an ink liquid reservoir 1 for containing ink liquid 2 therein, and a pump 3 for supplying the ink liquid 2 to a nozzle 10 through a conduit 4, an air chamber 5, an electromagnetic cross valve 6, a conduit 7 and a filter 9. The air chamber 5 functions to remove the pressure pulsation caused by the pump 3. The electromagnetic cross valve 6 determines the supply direction of the ink liquid. More specifically, when the electromagnetic cross valve 6 is in the ON state, the conduit 4 is communicated to the conduit 7 for supplying the ink liquid to the nozzle 10 under a predetermined pressure. Contrarily, when the electromagnetic cross valve 6 is in the OFF state, the conduit 7 is communicated to another conduit 8 for returning the ink liquid from the nozzle 10 to the ink liquid reservoir 1. That is, the ink liquid issuance from the nozzle 10 is terminated when the electromagnetic cross valve 6 is placed into the OFF state.

An electro-mechanical transducer 11 such as a piezo-vibrator is secured to the nozzle 10. The electro-mechanical transducer 11 is connected to receive an excitation signal of 25 KHz developed from an oscillator 12 through an amplifier 13, whereby ink droplets 14 of uniform mass are emitted from the nozzle 10 at the given frequency.

Print information data is introduced into the ink jet system printer through input/output interface 15. The thus introduced data is applied through a buffer memory 16 to a charging signal generator 17 comprising a video counter, a read only memory, a video generator and a video amplifier. The charging signal generator 17 is controlled by clock signals developed from the oscillator 12, and functions to develop ink droplet charging signals in accordance with the print information data introduced through the input/output interface 15.

The ink droplet charging signals are applied to a charging tunnel 18 to charge the ink droplets 14 in accordance with the print information data. The thus charged ink droplets 140 are deflected in response to the amount of charge carried thereon as they pass through a constant high-voltage field established by a pair of deflection electrodes 190 and 191. The thus deflected ink droplets 140 are deposited onto a recording paper 20. Ink droplets 141 not contributive to the actual printing operation are not charged nor deflected and directed to a beam gutter 21 for recirculation purposes.

The deflection of the ink droplets 140 is conducted in the Y-direction. The nozzle 10, the electro-mechanical transducer 11 and the charging tunnel 18 are mounted on a printer head 22 which is driven to reciprocate in the X-direction by a printer head driver 23. In this way, a desired character is printed on the recording paper 20 in a dot matrix fashion. The recording paper 20 is supported by a paper drive mechanism 24 including a platen 25 and a sprocket roller 26. The recording paper 20 is driven to shift its position along the Y-axis by one row distance after completion of one line printing through the use of a paper driver 27.

In the above-mentioned basic ink jet system printer, the ink droplets 141 not contributive to the actual printing operation are collected by the beam gutter 21 and returned to the ink liquid reservoir 1. When the print information data is introduced into the ink jet system printer and the charged ink droplets 140 are deposited on the recording paper 20, new ink liquid is supplied to the system by the amount corresponding to the amount of the ink liquid reduced by the charged ink droplets 140. Therefore, the ink liquid concentration is maintained around a predetermined value as long as the print information data is applied to the ink jet system printer. However, when the print information data is not applied to the ink jet system printer, all of the ink droplets emitted from the nozzle 10 are directed to the beam gutter 21 for recirculation purposes as long as the ink jet system printer is supplied with power. The ink liquid concentration is gradually increased because a portion of the volatile component included within the ink liquid is vaporized while the ink droplets 141 travel in the air from the nozzle 10 to the beam gutter 21.

Figure 2:
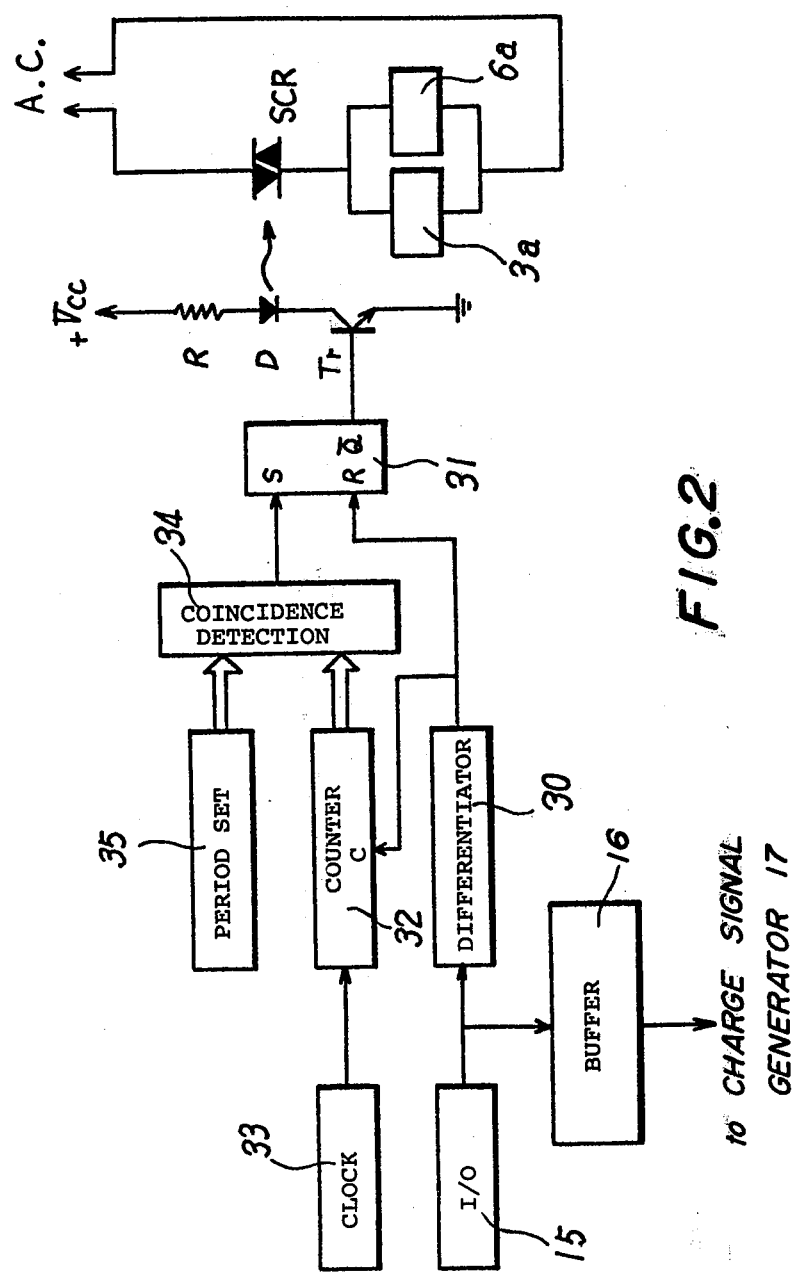
FIG. 2 is a block diagram of an embodiment of an ink liquid issuance control system of the present invention.

The increase of the ink liquid concentration will influence stable printing. In order to prevent the above defects, in accordance with the present invention, the ink liquid issuance from the nozzle 10 is terminated when the print information data is not applied to the ink jet system printer for a predetermined time period even when the ink jet system printer is supplied with power. FIG. 2 shows an embodiment of an ink liquid issuance control system of the present invention.

The print information data introduced through the input/output interface 15 is applied not only to the buffer memory 16 but also to a differentiation circuit 30, which develops an differentiated output when the print information data is introduced through the input/output interface 15. The circuit of FIG. 2 is so constructed as to be a logic value "H" when the differentiated output is developed from the differentiation circuit 30. The differentiated output is applied to a reset input terminal R of a reset priority type S-R flip-flop 31. The $\overline{Q}$ output of the S-R flip-flop 31 is led to the base electrode of a transistor Tr. The collector electrode of the transistor Tr is connected to a power source $+V_{cc}$ through a resistor R and a light emitting diode D. The emitter electrode of the transistor Tr is grounded. A bidirectional photo thyristor SCR is optically coupled to the light emitting diode D and is connected to an A.C. power source through a parallel circuit comprising a motor 3a for driving the pump 3 and a coil 6a for activating the electromagnetic cross valve 6.

In the case where the print information data is introduced through the input/output interface 15, the output signal of the differentiation circuit 30 takes the "H" level. Therefore, the transistor Tr is ON and, hence, the light emitting diode D emits light.

The thyristor SCR is ON to enable the motor 3a and the coil 6a. Accordingly, when the print information data is applied to the ink jet system printer, the pump 3 is activated to supply the ink liquid to the nozzle 10 through the electromagnetic cross valve 6 which is placed in the ON state.

The output signal of the differentiation circuit 30 is applied not only to the S-R flip-flop 31 but also to a clear terminal C of a counter 32. The counter 32 counts clock signal developed from a clock generator 33 while the output signal of the differentiation circuit 30 takes the "L" level. That is, the counter 32 functions to count up the clock signal for a time period during which the print information data is not applied to the ink jet system printer. The count contents of the counter 32 is applied to a coincidence detection circuit 34 which also receives an output signal from a time period setting circuit 35 for determining a desired time period.

When the count contents stored in the counter 32 reach the desired time period determined by the time period setting circuit 35, the coincidence detection circuit 34 develops an output signal to set the S-R flip-flop 31. That is, in the case where the print information data is not applied to the ink jet system printer for a time period determined by the time period setting circuit 35, the transistor Tr is turned OFF to terminate the power supply to the motor 3a and the coil 6a.

In this way, the ink liquid issuance from the nozzle 10 is terminated and the ink liquid is returned from the nozzle 10 to the ink liquid reservoir 1 through the conduit 7, the electromagnetic cross valve 6 and the conduit 8 when the print information data is not applied to the ink jet system printer for a predetermined time period.

The time period determined by the time period setting circuit 35 is desirably selected. When the introduction of the print information data is interrupted and, then, again conducted before the time period determined by the time period setting circuit 35 has passed, the counter 32 is cleared to zero, and, therefore, the ink liquid issuance is continuously performed. Since the logic circuit is separated from the motor 3a and the coil 6a through the use of an optical coupler comprising the light emitting diode D and the thyristor SCR, the operation of the ink liquid issuance control system is stable.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer of the charge amplitude controlling type including means for generating print information data, which ink jet system printer emits charged ink droplets from a nozzle, deflects said charged ink droplets in accordance with said print information data and deposits said deflected ink droplets on a record receiving medium; an ink droplet issuance control system, for said printer comprising:

detection means for detecting the occurrence of said print information data and developing a detection output signal when said print information data is applied to said ink jet system printer;

determination means responsive to the absence of said detection output signal for developing a control signal when said detection output signal fails to occur after the lapse of a predetermined time period; and ink droplet issuance terminating means responsive to said control signal for terminating the issuance of the ink droplets from the nozzle when said control signal is developed from said determination means.

2. In the ink jet system printer of claim 1, wherein said detection means comprises a differentiation circuit means responsive to said print information data for developing a differentiated output signal representing said detection output signal when said print information data is applied to said ink jet system printer said differentiated output signal energizing said determination means thereby preventing the generation of said control signal and the termination of the issuance of ink droplets from the nozzle.

3. In the ink jet system printer of claim 2, wherein said means for generating print information data comprises an input/output interface means through which said print information data is applied to said differentiation circuit.

4. In the ink jet system printer of claim 1, wherein said determination means comprises:

clock generator means for developing clock signals;

counter means responsive to said clock signals from said clock generator means and to said detection output signal from said detection means for providing a count of the elapsed time since energization of said counter means by said detection output signal from said detection means;

time period setting means for establishing said predetermined time period; and coincidence detection circuit means for developing said control signal when the count of said counter means equals said predetermined time period determined by said time period setting means.

5. In the ink jet system printer of claim 4, the invention further comprising a reset priority type S-R flip-flop means having a reset input terminal connected to receive said detection output signal developed from said detection means, said flip-flop means having a set input terminal connected to receive said control signal developed from said coincidence detection circuit means, and an output terminal means for generating an output signal in response to energization of said reset input terminal of said flip-flop means, said output terminal means being connected to said ink droplet issuance terminating means.

6. In the ink jet system printer of claim 1, said ink droplet issuance terminating means comprising:

a light emitting element;

driver means connected to said light emitting element for activating said light emitting element and causing said light emitting element to emit light when said control signal is not developed from said determination means said driver means deactivating said light emitting element when said control signal is developed from said determination means; and a light responsive element responsive to stimulation by the activation of said light emitting element for activating said ink droplet issuance terminating means in response to the absence of light emission from said light emitting element.

7. In the ink jet system printer of claim 6, the invention further comprising:

ink liquid reservoir means for storing a reserve quantity of ink liquid;

nozzle unit means for emitting a series of ink droplets from said nozzle unit toward a record receiving medium;

pump means for pumping said ink liquid from said ink liquid reservoir means to said nozzle unit means; and electromagnetic cross valve means in electrical communication with said light responsive element and a source of AC voltage potential and in fluid communication between said pump means and said nozzle unit means for activating to an ON state thereby providing a path of fluid flow and allowing said ink liquid to be pumped from said ink reservoir means to said nozzle unit means when said light responsive element is energized by the light emitted from said light emitting element and for deactivating to an OFF state thereby providing a path of fluid flow from said nozzle unit means to said ink reservoir means when said light responsive element is not energized by the light emitted from said light emitting element.

8. The invention of claim 7, wherein said electromagnetic cross valve means deactivates to said OFF state in response to the lapse of said predetermined time period since said print information data was supplied to said detection means.

9. An ink jet system printer of the charge amplitude controlling type comprising:

nozzle unit means for emitting ink droplets at a given frequency;

a charging tunnel, positioned at the forward periphery of said nozzle unit means through which said ink droplets pass;

interface means for introducing print information data into the ink jet system printer;

charge signal generator means connected to receive said print information data from said interface means for applying charging signals to said charging tunnel and charging said ink droplets in accordance with said print information data from said interface means;

deflection means for deflecting said charged ink droplets when said charged ink droplets pass through the deflection means, said charged ink droplets being deflected in accordance with the amounts of charge carried on the respective ink droplets;

a record receiving medium for receiving the deflected ink droplets;

an ink liquid reservoir for storing a supply of ink liquid therein;

pump means connected via a conduit to said ink liquid reservoir for pumping the ink liquid from said ink liquid reservoir to said nozzle unit under a predetermined pressure;

detection means responsive to said print information data supplied from said interface means for developing a detection output signal when said print information data is introduced into the ink jet system printer through said interface means;

determination means responsive to the absence of said detection output signal for developing a control signal when said detection output signal fails to occur after the lapse of a predetermined time period; and ink droplet issuance terminating means responsive to said control signal for terminating the operation of said pump means when said control signal is developed from said determination means.

10. The ink jet system printer of the charge amplitude controlling type of claim 9, which further comprises a beam gutter for collecting ink droplets which are not charged when passing through said charging tunnel nor deflected by said deflection means, and a conduit means for returning the collected ink liquid from said beam gutter to said ink liquid reservoir.

11. The ink jet system printer of the charge amplitude controlling type of claim 9, which further comprises an electromagnetic cross valve means disposed between said pump means and said nozzle unit means for supplying the ink liquid from said pump means to said nozzle unit means when the electromagnetic cross valve means is in an ON state and for returning the ink liquid from said nozzle unit means to said ink liquid reservoir when said electromagnetic cross valve means is in an OFF state.

12. The ink jet system printer of the charge amplitude controlling type of claim 11, wherein said ink jet droplet issuance terminating means places said electromagnetic cross valve means into said OFF state when said control signal is developed from said determination means.

13. In an ink jet system printer of the charge amplitude controlling type comprising means for generating print information data, emitting ink droplets at a given frequency from a nozzle, charging said ink droplets in accordance with said print information data, deflecting said charged ink droplets while they pass through a constant high voltage field, and depositing said deflected ink droplets on a record receiving medium; an ink droplet issuance control system for said printer comprising:

a determination means for developing a control signal when said print information data is not applied to the ink jet system printer for a predetermined time period; and ink droplet issuance terminating means for terminating the issuance of the ink droplets from said nozzle when said control signal is developed.

* * * * *